Jan. 14, 1958　　　G. P. ENGSTROM ET AL　　　2,820,177
MEANS FOR GRID CONTROL OF A CONVERTER
Filed Dec. 29, 1955　　　　　　　　　　　　3 Sheets-Sheet 2
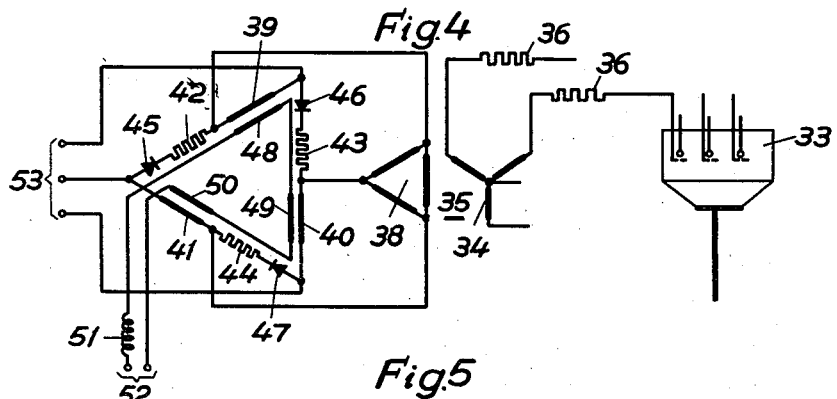
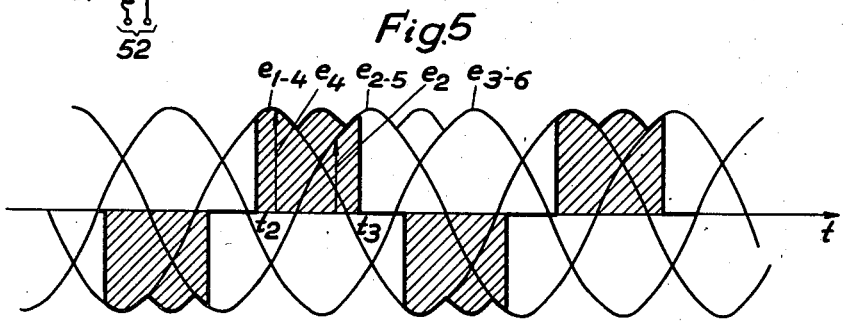
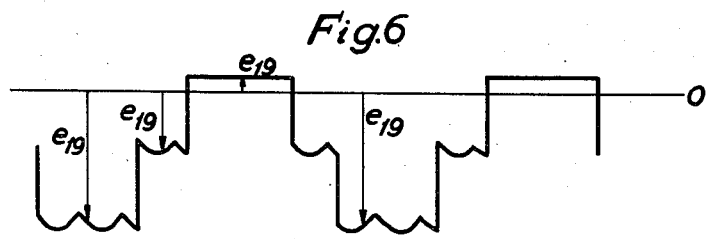
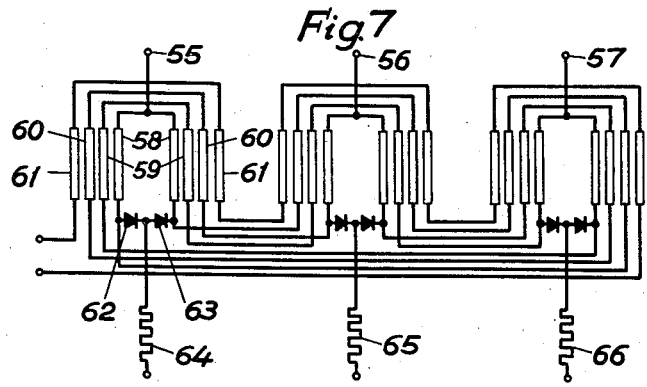
Inventors
Gunnar P. Engström
and Harry Forssell
By
— Attorney.

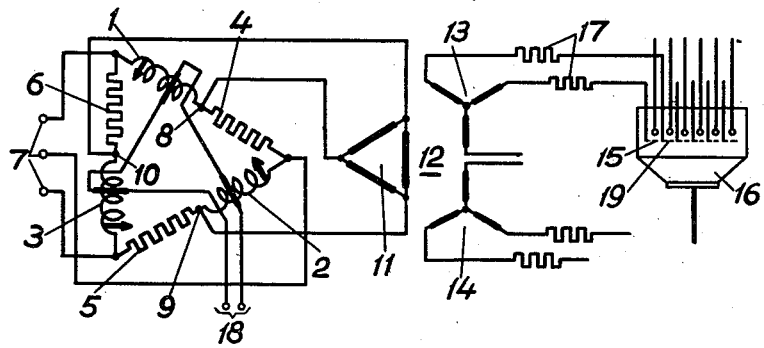
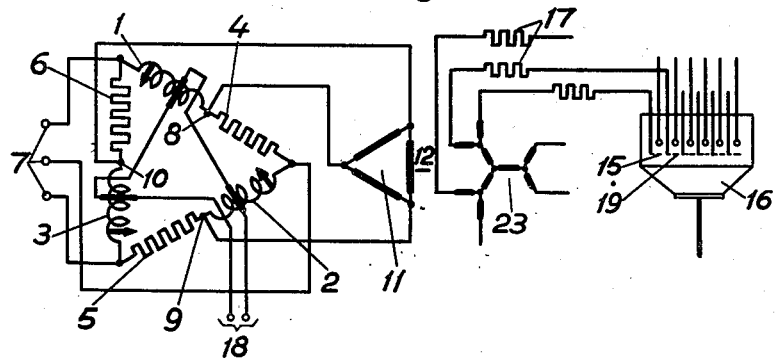
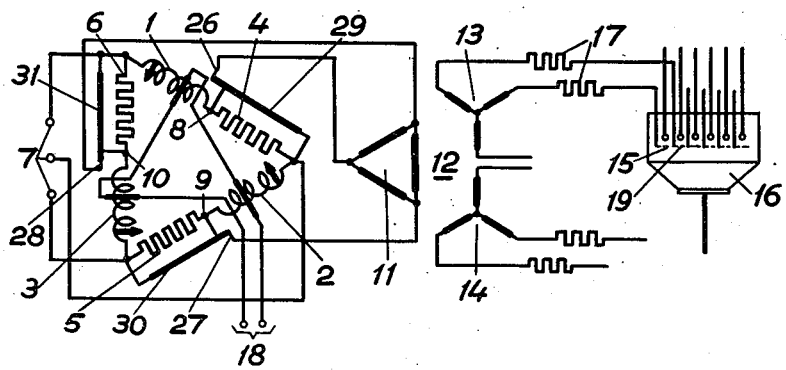

Jan. 14, 1958  G. P. ENGSTROM ET AL  2,820,177
MEANS FOR GRID CONTROL OF A CONVERTER
Filed Dec. 29, 1955  3 Sheets-Sheet 3
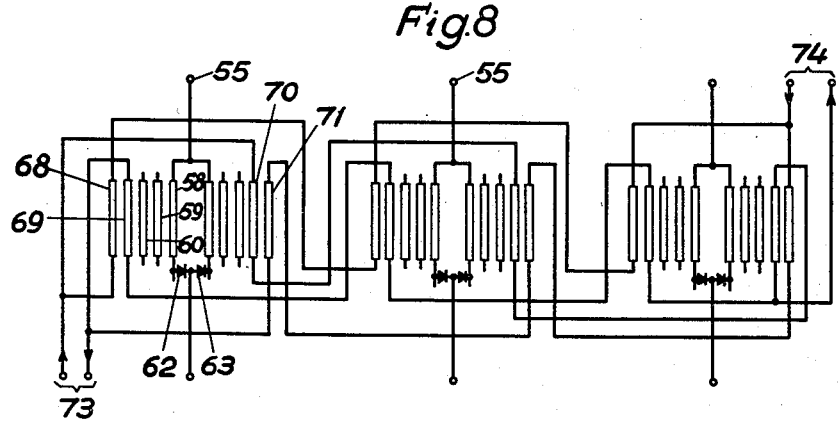
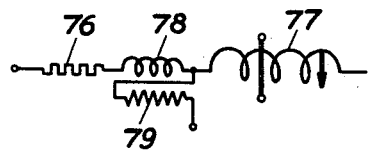
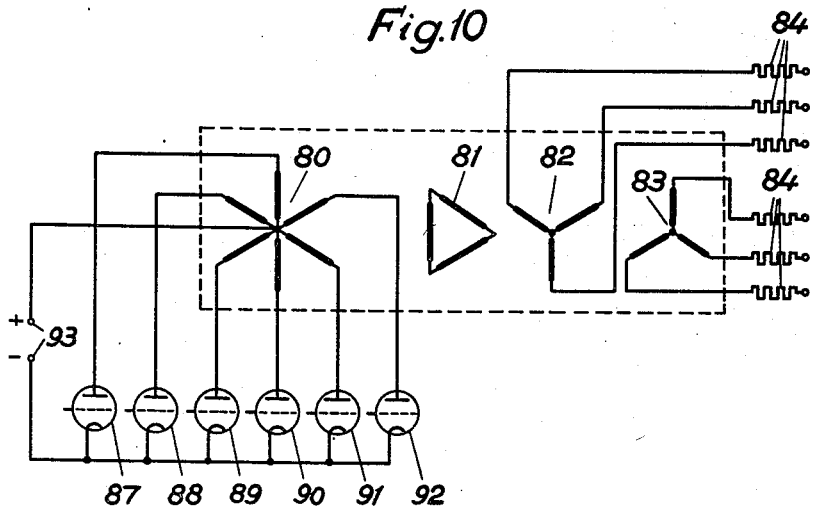
Inventors
Gunnar P. Engström
and Harry Forssell
By
Attorney

United States Patent Office 2,820,177
Patented Jan. 14, 1958

2,820,177

MEANS FOR GRID CONTROL OF A CONVERTER

Gunnar P. Engstrom and Harry Forssell, Ludvika, Sweden, assignors to Allmänna Svenska Elektriska Aktiebolaget, Vasteras, Sweden, a corporation of Sweden Application December 29, 1955, Serial No. 556,268

8 Claims. (Cl. 315—145)

The present invention relates to means for grid control of a current converter in order to obtain as favorable a form of the grid voltages as possible. The invention further relates to an especially favorable way of supplying said voltages to the grids. Such previously known means for grid control have been regarded as especially favorable in which the grid voltage of each anode of the converter is mainly determined by the voltage on the grid of a just burning anode. This desire will also be fulfilled by means according to the present invention. It is, however, desirable that the voltages, which shall determine the ignition of the grids, should be sufficiently steep in the moment of the ignition. Considerable advantages could thus be gained by using a grid control system combining the above mentioned conditions of giving a system which is not directly connected with any of the main circuits of the converter and in which the control grids will rapidly obtain positive voltages in the moment of ignition.

According to the present invention such a grid control system is obtained by arranging a device for delivering voltages with a time variation containing approximately momentaneous voltage jumps, which device directly or via a voltage distribution device is so connected to the grids of the converter that said grids within each independently commutating system will obtain voltages giving all not burning grids a negative potential in relation to that of the grid of the just burning anode, and that the grid which is to ignite is ignited by a positive voltage obtained in the form of a voltage jump.

A device which is able to give such voltage jumps can for instance comprise a thermionic tube, in which a number of valves will be successively conducting so that a rectangular or step-formed current curve is obtained, which may be supplied to a grid transformer. Such a device can also utilize the ability of a transductor to give a momentaneous change in voltage at a time when the knee point of the magnetization curve of the core material of the transductor is reached.

In the accompanying drawings some forms of the invention are diagrammatically shown. Figs. 1–4 show different possibilities when using transductors, Figs. 5 and 6 show diagrams of the grid voltage according to said forms, Figs. 7–9 illustrate means for balancing and compensating the transductors, and Fig. 10 shows a form utilizing thermionic tubes.

Figs. 1–4 principally show the same arrangement of the transductors used. In order to be able to vary the working points of the converters, it is necessary to be able to vary the time in which the voltage jump in the grid voltages is obtained. The said transductors then constitute the control members, and the control action is obtained by varying the D. C. magnetization of the transductors. According to Fig. 1 each of the transductors 1—3 is connected in series with a resistor 4—6 and connected in a delta, the corners of which are connected to three-phase mains at the terminals 7. In the transductor symbol the arrow indicates that the transductor is self-excited, which is usually achieved by connecting a half-wave rectifier in series with the power winding of each transducor element. To junction points 8—10 between the transductors and their series connected resistors the delta-connected primary winding 11 of a grid transformer 12 is connected. From two separate star-connected secondary windings 13 and 14 the grids 15 in a converter 16 are fed via resistors 17. In the drawing the converter is shown with six anodes and is presumed to be connected in two times three-phase connection with interphase transformers. The series connected control windings of the transductors 1—3 are connected to the terminals 18. The phase sequence of the transductor connection arranged in delta shall be so chosen that the main voltage of the grid transformer 12 is obtained as the sum of the voltage across the load resistor (e. g. the resistor 4) in one phase and the voltage across the transductor in the succeeding phase (e. g. the transductor 2). According to the well known theory for the self-excited transductor a voltage will be obtained across the resistors which in jumps will change its magnitude at a moment which is adjustable by varying the D. C. magnetization of the transductor.

The course of the voltages supplied to the control grids of the converter is shown in Figs. 5 and 6. In Fig. 5, the main voltages across each side of the transductor combination in Fig. 1 are shown, i. e. the voltage across the series connected transductors and resistors 1 and 4, 2 and 5, 3 and 6. These voltages are denoted $e_{1-4}$, $e_{2-5}$, $e_{3-6}$. The instant $t_2$, at which a voltage jump is obtained in the transductor 1, will momentaneously give a voltage across the resistor 4 designated $e_4$. This voltage together with the voltage $e_2$ across the transductor 2 in the succeeding phase is applied to one phase of the grid transformer 12 as primary main voltage. At the instant $t_3$ the voltage absorption of the transductor 2 ceases and the main voltage $e_{2-5}$ in the associated phase will be supplied across the resistor 5. The hatched area thus represents the main voltage supplied to the grid transformer 12. The grid 19 will ignite at the time $t_2$ and will be extinguished at the time $t_3$. The voltage of the said grid $e_{19}$, in relation to the cathode of the converter, is evident from Fig. 6. During the burning interval the potential of the grid 19 will be determined by the arc voltage drop, while the potential during the remaining intervals will be determined by the secondary main voltage of the grid transformer in relation to the just burning grid, thus giving the voltage curve shown in Fig. 6.

The presumptions for an exactly defined ignition of the grids are thus present at a connection shown in Fig. 1, where the grid transformer has galvanically separated secondary windings. In Fig. 2 said connection has been modified to a fork-connection of the secondary winding 23, which is intended to be used with a six phase converter. The transductor connection in this figure is unchanged.

The resistive voltage drop of the transductor elements will, however, have a voltage decreasing influence. This voltage drop can be eliminated by a compensation method according to Fig. 3. Instead of deriving the main voltage of the grid transformer from the points 8—10, said voltage will be derived from the terminals 26—28 of the auto-transformers 29—31, respectively, which are arranged across each resistor 4—6.

Fig. 4 shows a modified arrangement of the transductor to be used with a three-anode converter 33 having its grids connected to the star-connected secondary winding 34 of the grid transformer 35. Resistors 36 are then connected in the grid connectors. To the delta-connected primary winding 38 of the grid transformer a phase angle producer is connected, which in each branch of a delta-connected combination consists of a transductor element 39, 40, 41, respectively, a resistor 42, 43, 44, respectively, and a half-wave rectifier 45, 46, 47, respectively. In a similar way as has been described in connection with the Figs. 1–3, the main voltage of the grid transformer is delivered by the voltage across the load resistor and the rectifier in one phase and the voltage across the transductor element in the succeeding phase. The transductor elements 39, 40 and 41 are controlled by means of control windings 48, 49 and 50, respectively, the latter being series connected and connected to a D. C. source at the terminals 52 via a smoothing device 55. The delta-connected transductor combination is connected to three-phase means at the terminals 53.

In order to pay regard to differences, e. g. in excitation properties or winding data between the different transductors, which may give the result that the voltage jumps will occur at differently large time intervals, some sort of balancing may be desirable. Fig. 7 shows an arrangement for this purpose, showing connection terminals for three-phase mains 55, 56, 57 and three transductors, each consisting of two cores (not shown), each having four windings 58, 59, 60 and 61. The two power windings 58 on the two cores in one transductor are connected in series with half-wave rectifiers 62, 63 for providing self-excitation in a known manner. The load resistors 64, 65, 66 in the transductor combination described above are connected in series with each transductor in this figure. In parallel with the two self-excitation half-wave rectifiers of a transductor the compensation windings 59 and 60 connected to both of the two other transductors are series connected.

If, owing to some irregularity, the current in one phase of the connection should deviate from the currents in the other phases, e. g. by being larger than the last mentioned currents, a larger voltage will be obtained across the self-excitation half-wave rectifiers in the first mentioned phase than in the other phases. This voltage will give rise to an excitation current in the transductors in the other phases and this current will have such an influence that the current through said last mentioned transductors will increase, thereby effecting a balancing.

If the converter is double-wye connected and thus comprises two three-pulse groups and an interphase transformer, as indicated in Figs. 1 and 3, the voltage jumps from the transductor elements, the power winding of which is series connected with the half-wave rectifiers 62 of the other phases, will control one of the three-pulse groups, and those transductor elements, the power winding of which is series connected with half-wave rectifiers 63, will control the other three-pulse group. Thus it is possible to balance the two three-pulse groups by correcting the excitation of the first mentioned transductor elements in relation to the last mentioned transductor elements. For this purpose a connection according to Fig. 8 may be used. Instead of using one control winding and connecting said winding on each transductor element in series as in Fig. 7, two control windings 68 and 69 are arranged according to Fig. 1. Said control windings are connected to terminals 73, connected to a source of control current and further to terminals 74 connected to a source of balancing current. The connection has the properties that the two terminals for the control current may represent two opposite corners of a bridge connection and the terminals for the balancing current the two remaining corners. One branch in this bridge connection will then consist of the three series connected windings 68 of each phase. The next branch will consist of the three series connected windings 70. The succeeding branch comprises the windings 71, and the last branch the three series connected windings 69. The balancing current, which senses the unbalance between the two three-pulse groups of the converter, will thus increase the excitation in the left hand transductor elements of each transductor in Fig. 1 and will decrease the excitation of the three right hand transductor elements thus eliminating the unbalance.

In order to increase the steepness of the voltage jumps, a connection according to Fig. 9 can be used. Between the resistor 76 and the transductor 77 in one phase of a transductor combination of the types described above, e. g. in Fig. 1, a reactor 78 is connected. This reactor is provided with a secondary winding 79, across which a voltage will be obtained which is proportional to the steepness of the voltage across the resistor 76. This voltage will be added to the voltage across the resistor 76, so that the steepness of the voltage supplied to the grids will be increased.

Fig. 10 shows a modified way of obtaining steep voltage jumps for the grid control. In this case the grid transformer consists of a primary winding 80 and three windings 81, 82 and 83, the first mentioned one of which being delta-connected and the two last mentioned ones being star-connected and via resistors 84 connected to terminals to which the grids of a six anode converter are connected. The primary winding 80 of the transformer is connected in six phase star, and each phase winding is connected in series with its thermionic valve 87—92, respectively. The cathodes of all valves are connected in parallel to one of the terminals 93 of a D. C. source. The other terminal 93 is connected to the neutral point of the transformer winding 80. By applying control voltages to the grids of the valves 87—92 in such a way that two adjacent valves are conducting simultaneously and each valve being conducting during 120° and having a non-conducting interval of 240°, it will be obtained that the direct voltage across the terminals 93 will be momentaneously connected to successive primary phase windings and voltage impulses will be transformed to the grids of the converter in a well known manner. This connection will in principle give the same voltage variation as shown in Fig. 6.

We claim as our invention:

1. Means for grid control of a current converter in which the grid voltage of a not burning anode is mainly determined by the voltage of the grid of a just burning anode and the voltage difference between the grids of said anodes, comprising a device for delivering voltages with a time variation containing approximately momentaneous voltage jumps, means whereby said device is so connected to the grids of the converter that said grids within each independently commutating system will obtain voltages giving all not burning grids a negative potential in relation to that of the grid of the just burning anode, and that the grid which is to ignite is ignited by a positive voltage obtained in the form of a voltage jump.

2. A device according to claim 1, comprising a device for voltage distribution, the secondary side of which is connected to the grids of the converter, is provided with primary windings, which are connected to a direct voltage source via grid controlled thermionic valves, which are so controlled that successively two primary windings, being adjacent in phase, are simultaneously conducting during 120° and are non-conducting during 240°.

3. A device according to claim 1, in which said device for delivering voltage jumps comprising a three-phase supplied delta-connected transductor-resistor combination, in which in each phase a resistor is series connected with a transductor, which is self-excited by means of half-wave rectifiers connected in series with its power windings, the junction point between the transductor and the resistor for each phase being connected to a primarily three-phase connected transformer, to the secondary side of which the grids of the converter are connected.

4. A device according to claim 3, in which a control winding of each transductor is connected in series with a corresponding winding of the other transductors and connected to a control voltage source.

5. A device according to claim 3, in which the resistive voltage drop of each transductor is compensated by deriving a correspondingly higher voltage from an auto-connected transformer connected in parallel with each resistor instead of deriving it from said junction points.

6. A device according to claim 3, comprising a reactor connected in series with the resistor in each phase and in which the voltage distribution device is connected to a secondary winding auto-connected to said reactor instead of being derived from said junction points.

7. A device according to claim 1, in which said device for deriving voltage jumps consists of a three-phase supplied delta-connected transductor-resistor combination, in which in each phase a half-wave rectifier, a resistor and the power winding of a transductor element are connected in series, the junction points between said resistor and said power winding in each phase being connected to a primarily three-phase connected transformer, to the secondary side of which the grids of the converter are connected.

8. A device according to claim 3, in which the converter is connected in double-wye connection with two three-pulse groups and an interphase transformer and in which the current distribution transformer for the grid voltages of the converter is provided with separate winding systems for each three-pulse group, characterised in that each transductor element of the transductors is provided with two separate control windings, each one of which being connected in series with equally situated control windings of the two other transductor elements in opposite branches of a bridge connection, the control current of the transductor connection being supplied to one diagonal and a current derived from the unbalance between the said two three-pulse groups being supplied to the other diagonal of the bridge connection.

References Cited in the file of this patent

UNITED STATES PATENTS

| | | |
|---|---|---|
| 2,598,432 | Price | May 27, 1952 |
| 2,598,433 | Mittag | May 27, 1952 |